United States Patent
Lo et al.

(10) Patent No.: US 8,765,249 B2
(45) Date of Patent: Jul. 1, 2014

(54) TOUCH PANEL FRAME STRUCTURE

(75) Inventors: Wen-Chin Lo, Pingzhen (TW); Chi-Sheng Lin, Zhongli (TW)

(73) Assignee: CPT Technology (Group) Co., Ltd., Fuzhou, Fujian (CN)

( * ) Notice: Subject to any disclaimer, the term of this patent is extended or adjusted under 35 U.S.C. 154(b) by 271 days.

(21) Appl. No.: 13/441,991

(22) Filed: Apr. 9, 2012

(65) Prior Publication Data

US 2013/0164479 A1   Jun. 27, 2013

(30) Foreign Application Priority Data

Dec. 26, 2011 (TW) .............................. 100148663 A (51) Int. Cl.
*G02F 1/1333* (2006.01)
(52) U.S. Cl.
CPC .................................. *G02F 1/133308* (2013.01)
USPC ................... 428/99; 428/60; 349/58; 362/633
(58) Field of Classification Search
CPC ................................................... G02F 1/33308
USPC ................... 428/60, 99, 138; 349/58; 362/633
See application file for complete search history.

(56) References Cited

U.S. PATENT DOCUMENTS 7,116,386 B2   10/2006   Lee et al.

FOREIGN PATENT DOCUMENTS

JP   2008-242334   10/2008
TW   M341892   10/2008

OTHER PUBLICATIONS

English translation of abstract of TW M341892.
English translation of abstract of JP 2008-242334.

*Primary Examiner* — Alexander Thomas
(74) *Attorney, Agent, or Firm* — CKC & Partners Co., Ltd.

(57) ABSTRACT

A touch panel frame structure is provided and includes a first frame including positioning grooves, a second frame covered by the first frame, a third frame, and an adhesive layer. The second frame includes first fixing portions located in the positioning grooves. The third frame includes a body portion, a supporting portion located on an inner edge of the body portion, and positioning boards. Each of the positioning boards is connected to the body portion and is coupled to one of the positioning grooves. Each of the positioning boards includes a plurality of second fixing portions. Each of the second fixing portions is fastened to one of the first fixing portions, such that each of the positioning boards is detachably fixed in one of the positioning grooves. The adhesive layer is located on the supporting portion to adhere a touch panel assembly.

10 Claims, 7 Drawing Sheets

TOUCH PANEL FRAME STRUCTURE

RELATED APPLICATIONS

This application claims priority to Taiwan Application Serial Number 100148663, filed Dec. 26, 2011, which is herein incorporated by reference.

BACKGROUND

1. Technical Field

The present disclosure relates to a touch panel frame structure, more particularly to a detachable touch panel frame structure.

2. Description of Related Art

In recent years, various technically advanced consumer electronics products have been developed. Electronic devices including touch functions have become increasingly ubiquitous in modern society. Smartphones and tablet computers are examples of such electronic devices. Through the aforementioned portable electronic devices, people may communicate information via networks, watch videos, and listen to music anytime and at any location.

A conventional electronic device usually includes a touch panel assembly and a liquid crystal (LC) panel module which includes an external frame. When assembling the touch panel assembly and the LC panel module, the LC panel module is first placed into a concave portion of an adhering tool. Subsequently, the touch panel assembly is adhered on the external frame of the LC panel module using twin adhesive. However, the touch panel assembly does not easily detach from the external frame of the LC panel module when this method of attachment is used.

When repairing the electronic device, the touch panel assembly must be forcibly detached from the external frame of the LC panel module using an external force, such that the touch panel assembly and the external frame of the LC panel module may be damaged easily. As a result, material costs would be increased, and time would also be wasted when detaching the touch panel assembly.

In order to ensure that the touch panel assembly is correctly adhered to the LC panel module, the touch panel assembly and the LC panel module need to be positioned by the adhering tool during assembly. Therefore, due to the fact that the adhering tool is required, overall costs and assembly are increased.

SUMMARY

An aspect of the present invention is to provide a touch panel frame structure.

In an embodiment of the present invention, a touch panel frame structure includes a first frame including positioning grooves, a second frame covered by the first frame, a third frame, and an adhesive layer. The second frame includes first fixing portions located in the positioning grooves. The third frame includes a body portion, a supporting portion located on an inner edge of the body portion, and positioning boards. Each of the positioning boards is connected to the body portion and respectively coupled to one of the positioning grooves. Each of the positioning boards includes a plurality of second fixing portions. Each of the second fixing portions is fastened to one of the first fixing portions, such that each of the positioning boards is detachably fixed in one of the positioning grooves. The adhesive layer is located on the supporting portion to adhere a touch panel assembly.

In an embodiment of the present invention, the supporting portion is perpendicular to each of the positioning boards.

In an embodiment of the present invention, the body portion, the supporting portion, and the positioning boards are integrally formed as a single piece.

In an embodiment of the present invention, the touch panel frame structure further includes a back board. The back board and the supporting portion are located at opposite sides of the first frame, and an accommodating space is formed between the back board and the touch panel assembly.

In an embodiment of the present invention, a width of the adhesive layer is no more than a width of the supporting portion.

In an embodiment of the present invention, each of the first fixing portions and each of the second fixing portions respectively include arc shapes.

In an embodiment of the present invention, each of the first fixing portions and each of the second fixing portions respectively include rectangular shapes.

In an embodiment of the present invention, the adhesive layer includes a twin adhesive.

In an embodiment of the present invention, the material forming the first frame includes iron or stainless steel.

In an embodiment of the present invention, the material forming the second frame and the third frame includes plastic.

In the aforementioned embodiments of the present invention, the second frame is located in the first frame and includes the first fixing portions located in the positioning grooves. Each of the positioning boards of the third frame includes the second fixing portions, and each of the second fixing portions can be fastened to one of the first fixing portions. When the positioning boards of the third frame are coupled to the positioning grooves, the second fixing portions of the positioning boards are fastened to the first fixing portions. Because the positioning boards are detachably fixed in the positioning grooves, the third frame is detachably fixed on the first frame. Furthermore, the adhesive layer is located on the supporting portion of the third frame and is used to adhere the touch panel assembly to the third frame. The accommodating space formed between the back board and the touch panel assembly may accommodate an LC panel module.

Since the third frame may be detached from the first frame, the touch panel assembly located on the third frame may be detached from the LC panel module located in the first frame. When repairing an electronic device including the touch panel frame structure, the touch panel assembly and the first frame, which is outside the LC panel module, are not damaged easily. As a result, not only are material costs reduced, but also, the time for detaching the touch panel assembly is decreased.

When assembling the touch panel assembly and the LC panel module, which is located in the first frame, the touch panel assembly may be precisely adhered to the supporting portion of the third frame without the use of any additional adhering tool. Therefore, assembly time may be decreased due to the structures of the first frame, the second frame, and the third frame.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
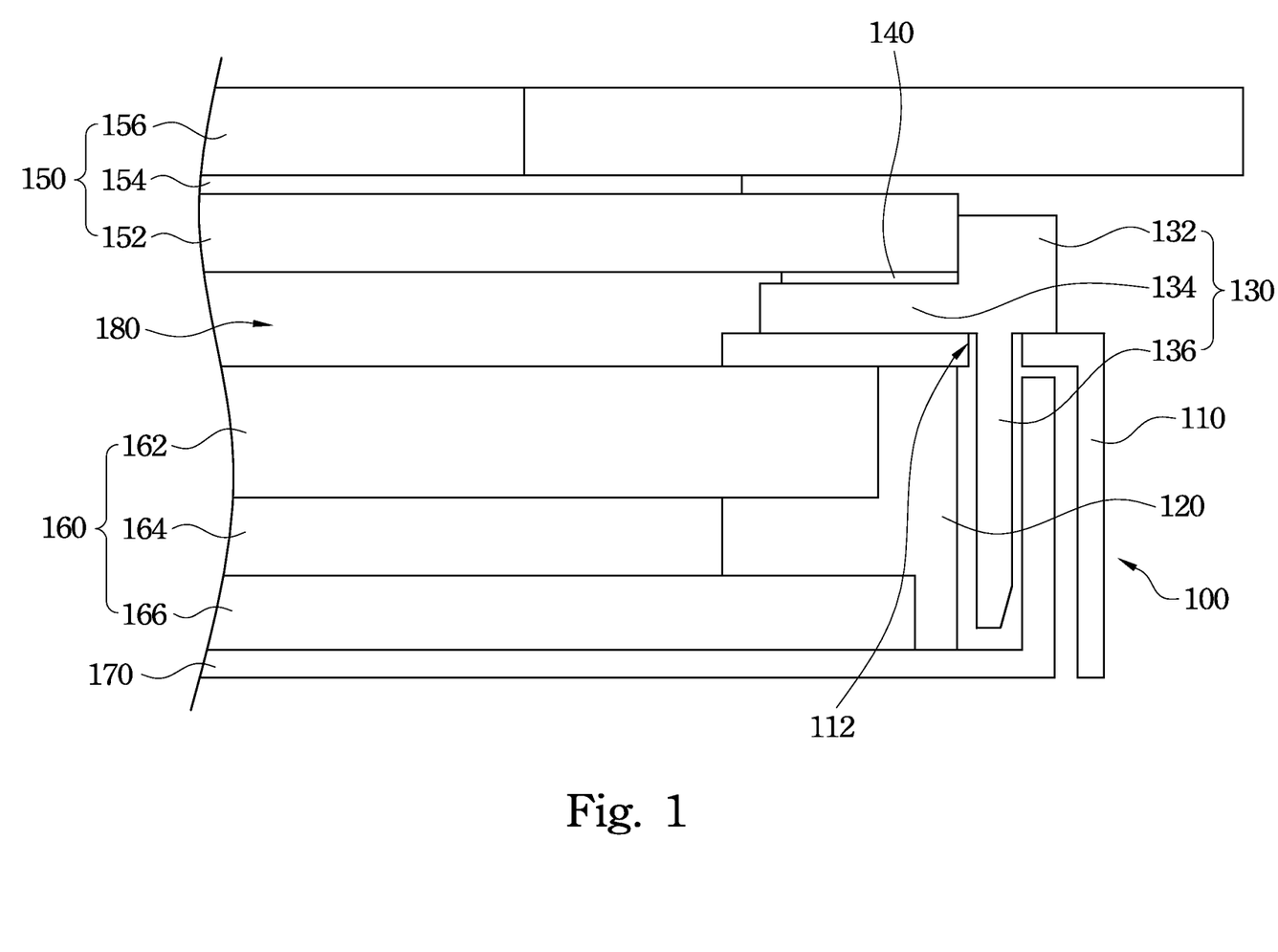
FIG. 1 is a schematic view of a touch panel frame structure of an embodiment of the present invention, shown in a state assembled to a touch panel assembly and a liquid crystal panel module.
Figure 2:
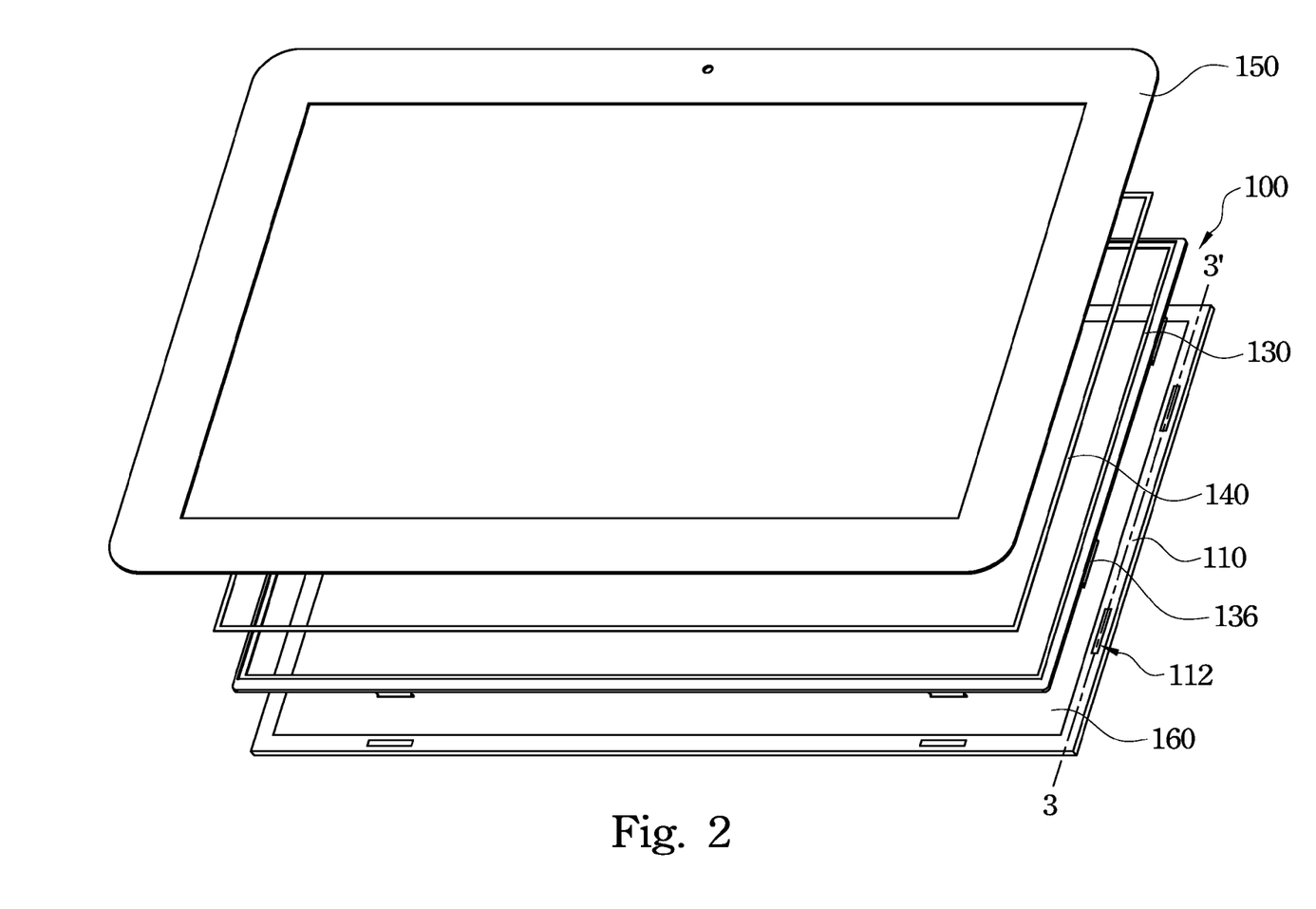
FIG. 2 is an exploded perspective view of the touch panel frame structure of FIG. 1, shown together with the touch panel assembly and the liquid crystal panel module.

FIG. 1 is a schematic view of a touch panel frame structure 100 of an embodiment of the present invention, shown in a state assembled to a touch panel assembly 150 and an LC panel module 160. FIG. 2 is an exploded perspective view of the touch panel frame structure 100 of FIG. 1, shown together with the touch panel assembly 150 and the LC panel module 160. As shown in FIG. 1 and FIG. 2, the touch panel frame structure 100 includes a first frame 110, a second frame 120, a third frame 130, and an adhesive layer 140. The first frame 110 includes positioning grooves 112. The second frame 120 is covered by the first frame 110. The third frame 130 includes a body portion 132, a supporting portion 134, and positioning boards 136. The supporting portion 134 is located on an inner edge of the body portion 132. Each of the positioning boards 136 is connected to the body portion 132 and is engaged with one of the positioning grooves 112. The adhesive layer 140 is located on the supporting portion 134 to adhere the touch panel assembly 150 to the third frame 130.

Furthermore, the touch panel frame structure 100 may further include a back board 170. The back board 170 and the supporting portion 134 are located at opposite sides of the first frame 110, and an accommodating space 180 is formed between the back board 170 and the touch panel assembly 150. The liquid crystal panel module 160 may be accommodated in the accommodating space 180.

In this embodiment, the supporting portion 134 is substantially perpendicular to each of the positioning boards 136. The word "substantially" is used to indicate that manufacturing errors may be such that the supporting portion 134 is not precisely perpendicular to the positioning boards 136. The material forming the first frame 110 may include iron or stainless steel. The material forming the second frame 120 and the third frame 130 may include plastic. The body portion 132, the supporting 134, and the positioning boards 136 may be integrally formed as a single piece. The adhesive layer 140 may include a twin adhesive.

Moreover, the touch panel assembly 150 may include a touch sensor 152, an optical adhesive 154, and a strengthening glass 156. The touch sensor 152 may be an indium tin oxide (ITO) glass.

The liquid crystal panel module 160 may include an LC panel 162, an optical adhesive 164, and a light guide plate 166.

Figure 3:
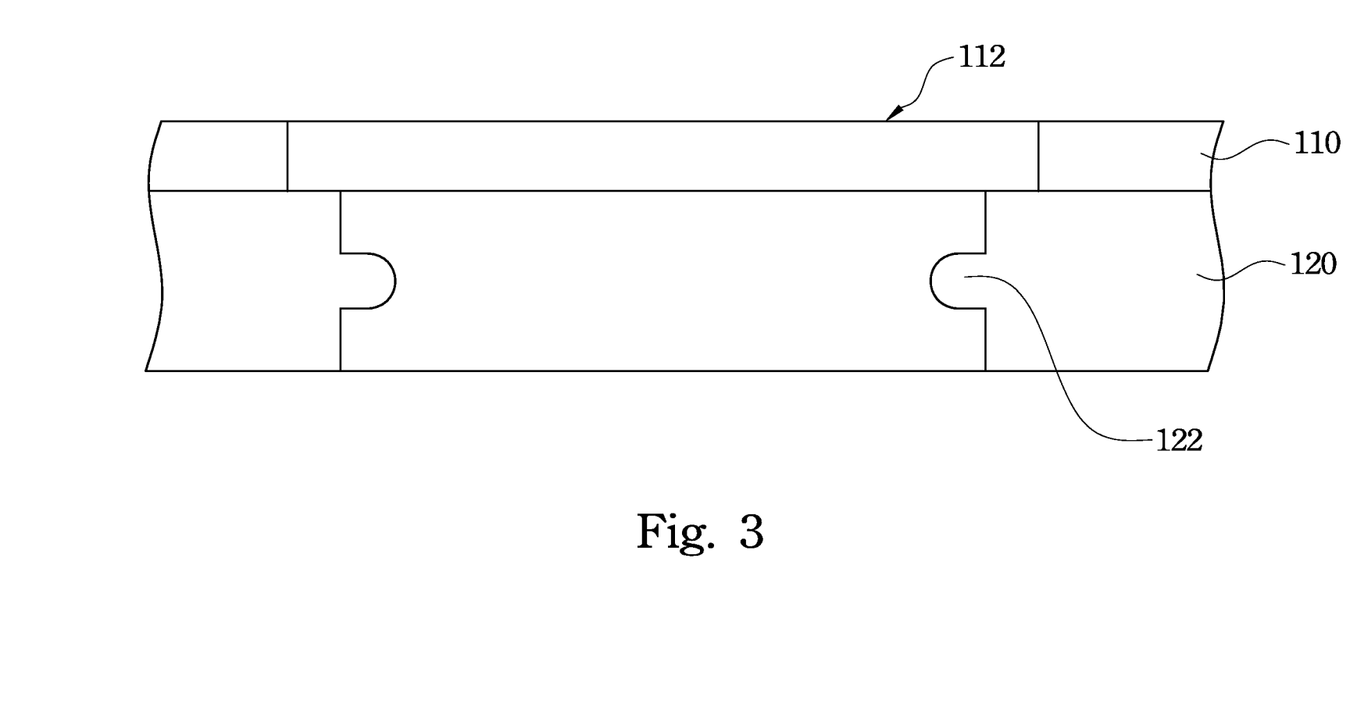
FIG. 3 is a partial cross-sectional view of a first frame taken along line 3-3' shown in FIG. 2.
Figure 4:
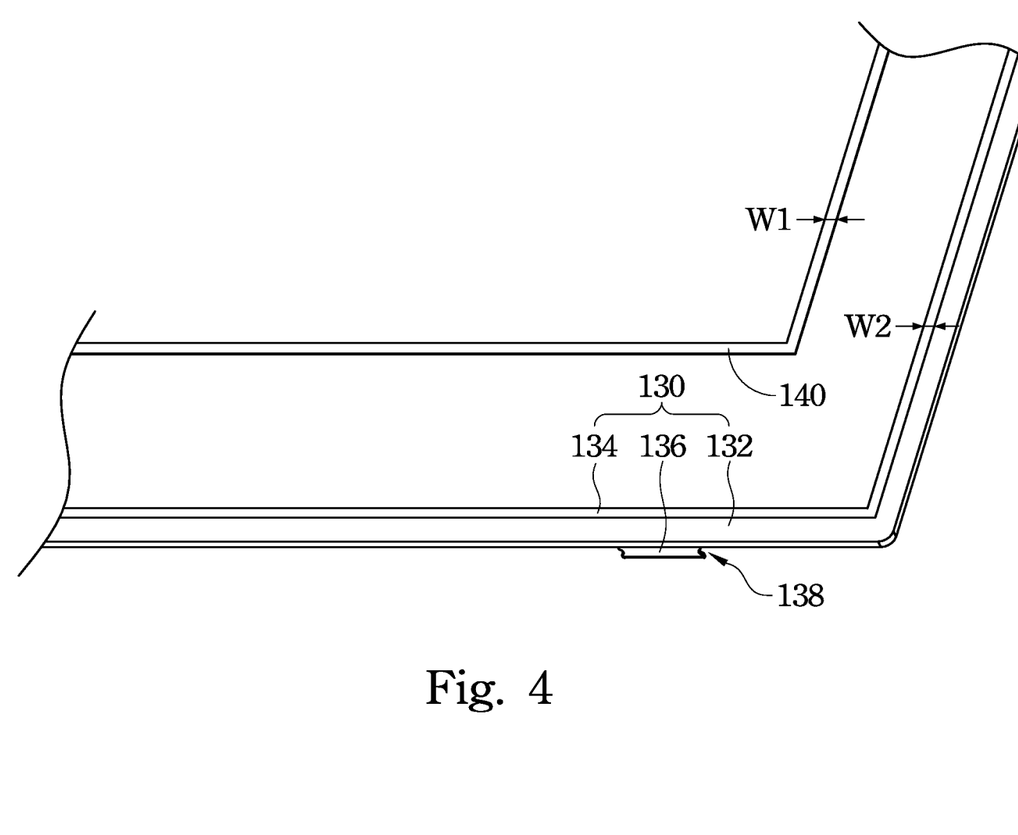
FIG. 4 is a partial enlarged view of a third frame and an adhesive layer shown in FIG. 2.

FIG. 3 is a partial cross-sectional view of the first frame 110 taken along line 3-3' shown in FIG. 2. FIG. 4 is a partial enlarged view of the third frame 130 and the adhesive layer 140 shown in FIG. 2. As shown in FIG. 3 and FIG. 4, the second frame 120 includes first fixing portions 122 located in the positioning grooves 112. Each of the positioning boards 136 includes second fixing portions 138. Each of the second fixing portions 138 may be fastened to one of the first fixing portions 122, such that each of the positioning boards 136 may be detachably fixed in one of the positioning grooves 112. Furthermore, a width W1 of the adhesive layer 140 is no more than a width W2 of the supporting portion 134.

Much of the connection information of the components described above will not be repeated in the following description, and only aspects related to conditions when the positioning boards 136 of the third frame 130 are fixed in the positioning grooves 112 of the first frame 110 will be described.

Figure 5:
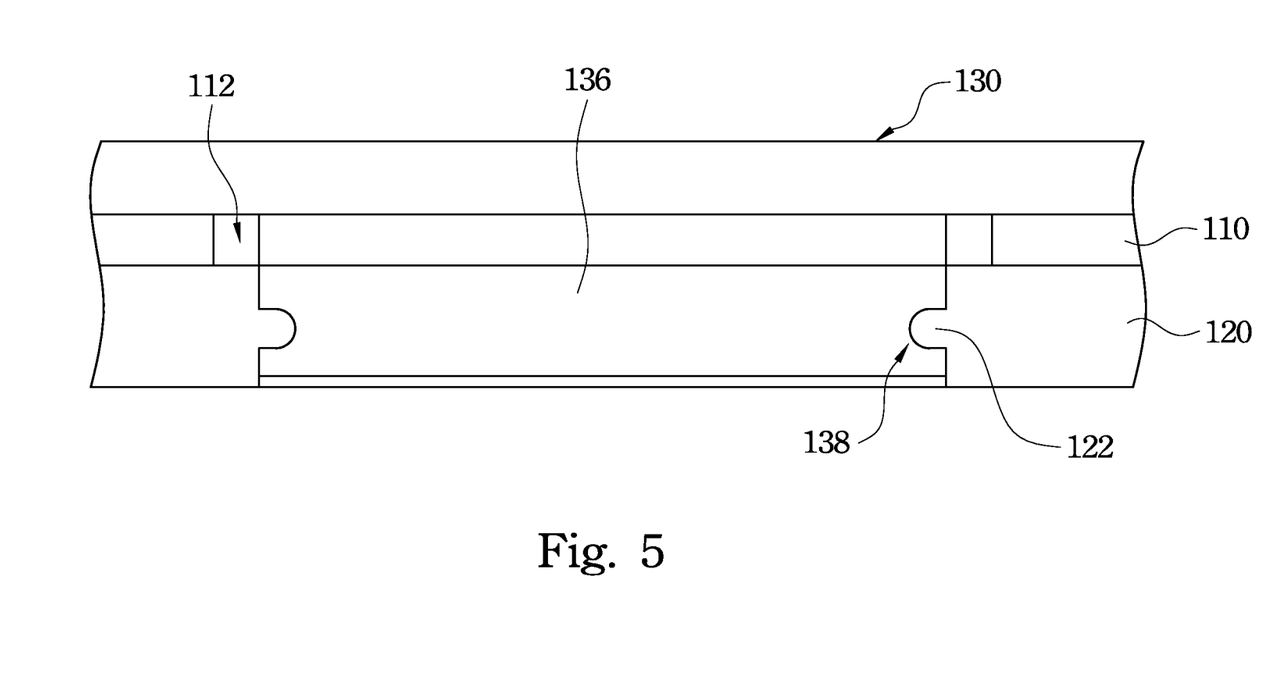
FIG. 5 is a schematic view of a positioning board fixed in a positioning groove shown in FIG. 2.

FIG. 5 is a schematic view of the positioning board 136 fixed in the positioning groove 112 shown in FIG. 2. As shown in FIG. 2 and FIG. 5, in this embodiment, each of the first fixing portions 122 has an arc shape, and each of the second fixing portions 138 also has an arc shape. However, in other embodiments, the first fixing portions 122 and the second fixing portions 138 may have other shapes, as long as the first fixing portions 122 can be fastened to the second fixing portions 138.

The second frame 120 is covered by the first frame 110 and includes the first fixing portions 122 located in the positioning grooves 112. Each of the positioning boards 136 of the third frame 130 includes the second fixing portions 138 capable of being fastened respectively to the first fixing portions 122. When the positioning boards 136 of the third frame 130 are coupled to the positioning grooves 112, the second fixing portions 138 of the positioning boards 136 are fastened to the first fixing portions 122. As a result, the positioning boards 136 may be detachably fixed in the positioning grooves 112, such that the third frame 130 may be detachably fixed on the first frame 110.

Because the third frame 130 may be detached from the first frame 110, the touch panel assembly 150 adhered on the third frame 130 by the adhesive layer 140 may be detached from the LC panel module 160 located in the first frame 110. When repairing an electronic device, the touch panel assembly 150 and the first frame 110, which is outside the LC panel module 160, are not damaged easily. Therefore, not only are material costs reduced, but also, the time for detaching the touch panel assembly 150 is decreased.

When assembling the touch panel assembly 150 and the LC panel module 160, which is located in the first frame 110, the touch panel assembly 150 may be precisely adhered to the supporting portion 134 (see FIG. 4) of the third frame 130 by the adhesive layer 140 without using any additional adhering tool. Therefore, the assembly time may be decreased due to the configuration including the positioning grooves 112 of the first frame 110, the first fixing portions 122 of the second frame 120, and the second fixing portions 138 of the positioning boards 136 of the third frame 130.

Figure 6:
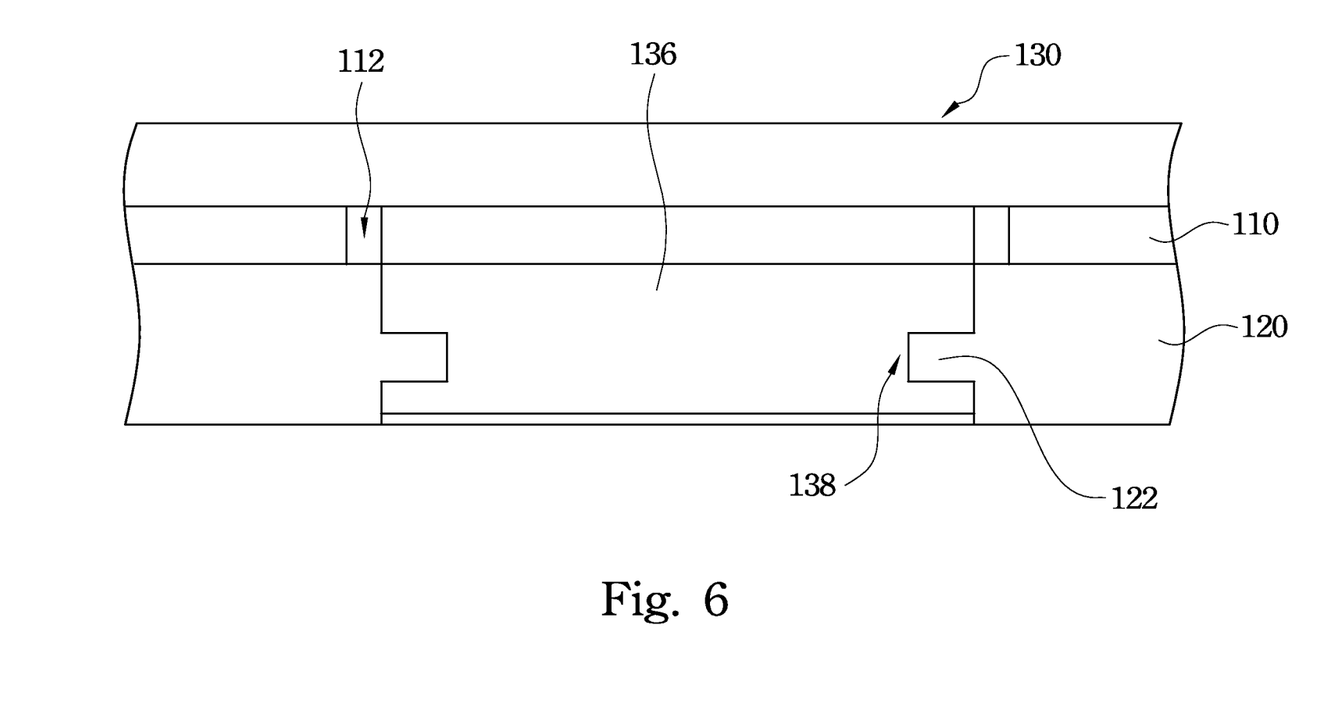
FIG. 6 is another embodiment of a first fixing portion and a second fixing portion shown in FIG. 5.

FIG. 6 is another embodiment of the first fixing portion 122 and the second fixing portion 138 shown in FIG. 5. The difference between this embodiment and the aforementioned embodiment is that each of the first fixing portions 122 has a rectangular shape, and each of the second fixing portions 138 also has a rectangular shape. As in the case of the embodiment described with reference to FIG. 5, when each of the positioning boards 136 of the third frame 130 is coupled to the corresponding positioning groove 112, the second fixing portions 138 of the positioning board 136 may be fastened to the first fixing portions 122. As a result, the positioning boards 136 may be detachably fixed in the positioning grooves 112, such that the third frame 130 may be detachably fixed on the first frame 110.

Figure 7:
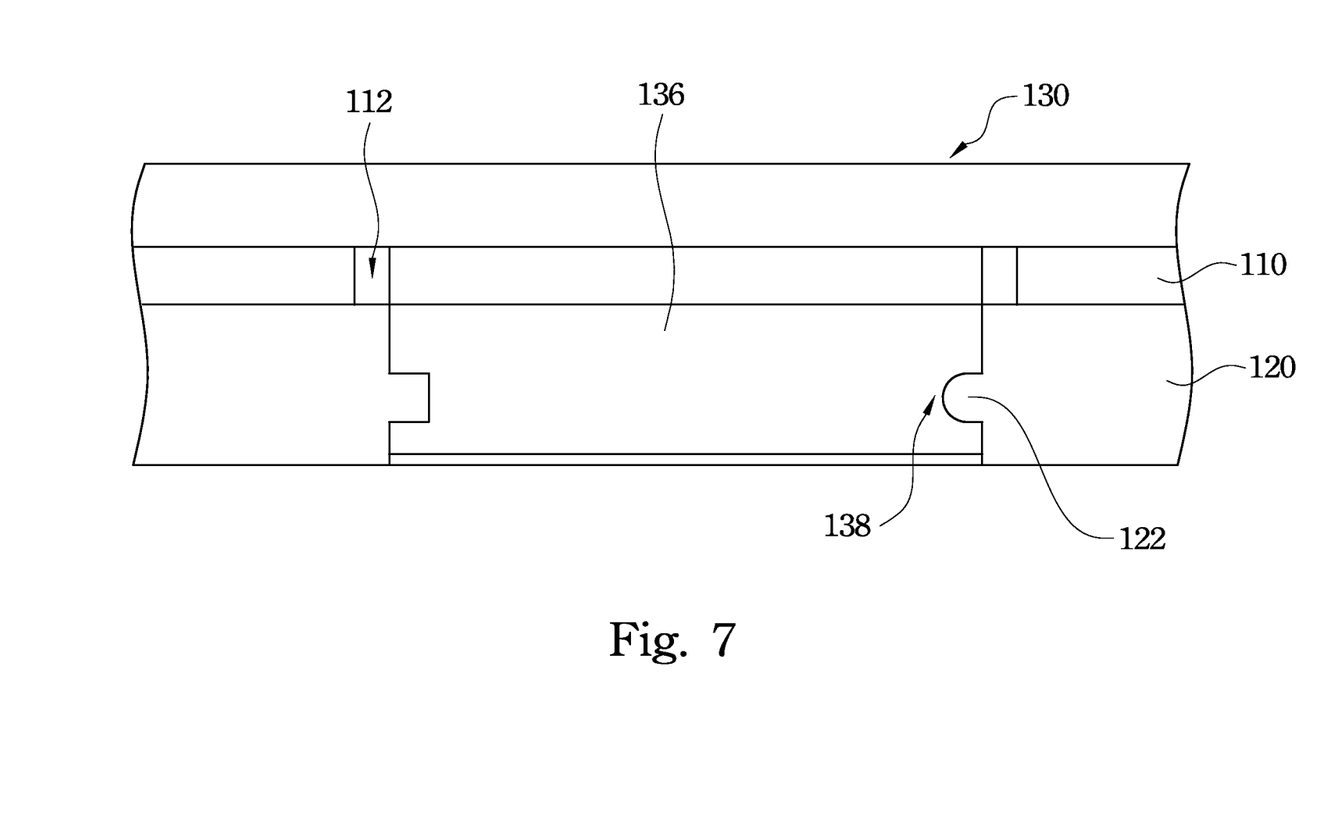
FIG. 7 is another embodiment of the first fixing portion and the second fixing portion shown in FIG. 5.

FIG. 7 is another embodiment of the first fixing portion 122 and the second fixing portion 138 shown in FIG. 5. The difference between this embodiment and the aforementioned embodiments is that the first fixing portions 122 respectively have a rectangular shape and an arc shape, and the second fixing portions 138 also respectively have a rectangular shape and an arc shape. The position of the first fixing portion 122 having the rectangular shape corresponds to the position of the second fixing portion 138 having the rectangular shape, and the position of the first fixing portion 122 having the arc shape corresponds to the position of the second fixing portion 138 having the arc shape. As in the case of the embodiment described with reference to FIG. 5, when each of the positioning boards 136 of the third frame 130 is coupled to the corresponding positioning groove 112, the second fixing portions 138 of the positioning board 136 may be fastened to the first fixing portions 122.

Compared with a conventional frame structure, the third frame may be detached from the first frame, so that the touch panel assembly located on the third frame may be detached from the LC panel module located in the first frame. When repairing an electronic device, the touch panel assembly and the first frame, which is outside the LC panel module, are not damaged easily. As a result, not only are material costs reduced, but also, the time for detaching the touch panel assembly is decreased. When assembling the touch panel assembly and the LC panel module, which is located in the first frame, the touch panel assembly may be precisely adhered to the supporting portion of the third frame without using any additional adhering tool. Therefore, the assembling time may be decreased due to the structures of the first frame, the second frame, and the third frame.

What is claimed is:

1. A touch panel frame structure comprising:
    a first frame comprising a plurality of positioning grooves;
    a second frame covered by the first frame, and the second frame comprises a plurality of first fixing portions located in the positioning grooves;
    a third frame comprising:
        a body portion;
        a supporting portion located on an inner edge of the body portion; and
        a plurality of positioning boards, wherein each of the positioning boards is connected to the body portion and respectively coupled to one of the positioning grooves, each of the positioning boards comprises a plurality of second fixing portions, and each of the second fixing portions is fastened to one of the first fixing portions, such that each of the positioning boards is detachably fixed in one of the positioning grooves; and
    an adhesive layer located on the supporting portion for adhering a touch panel assembly.

2. The touch panel frame structure as claimed in claim 1, wherein the supporting portion is perpendicular to each of the positioning boards.

3. The touch panel frame structure as claimed in claim 1, wherein the body portion, the supporting portion, and the positioning boards are integrally formed as a single piece.

4. The touch panel frame structure as claimed in claim 1, further comprising:
    a back board, wherein the back board and the supporting portion are located at opposite sides of the first frame, and an accommodating space is formed between the back board and the touch panel assembly.

5. The touch panel frame structure as claimed in claim 1, wherein a width of the adhesive layer is no more than a width of the supporting portion.

6. The touch panel frame structure as claimed in claim 1, wherein each of the first fixing portions and each of the second fixing portions respectively have arc shapes.

7. The touch panel frame structure as claimed in claim 1, wherein each of the first fixing portions and each of the second fixing portions respectively have rectangular shapes.

8. The touch panel frame structure as claimed in claim 1, wherein the adhesive layer comprises a twin adhesive.

9. The touch panel frame structure as claimed in claim 1, wherein the material forming the first frame comprises iron or stainless steel.

10. The touch panel frame structure as claimed in claim 1, wherein the material forming the second frame and the third frame comprises plastic.

* * * * *